Figure 1:
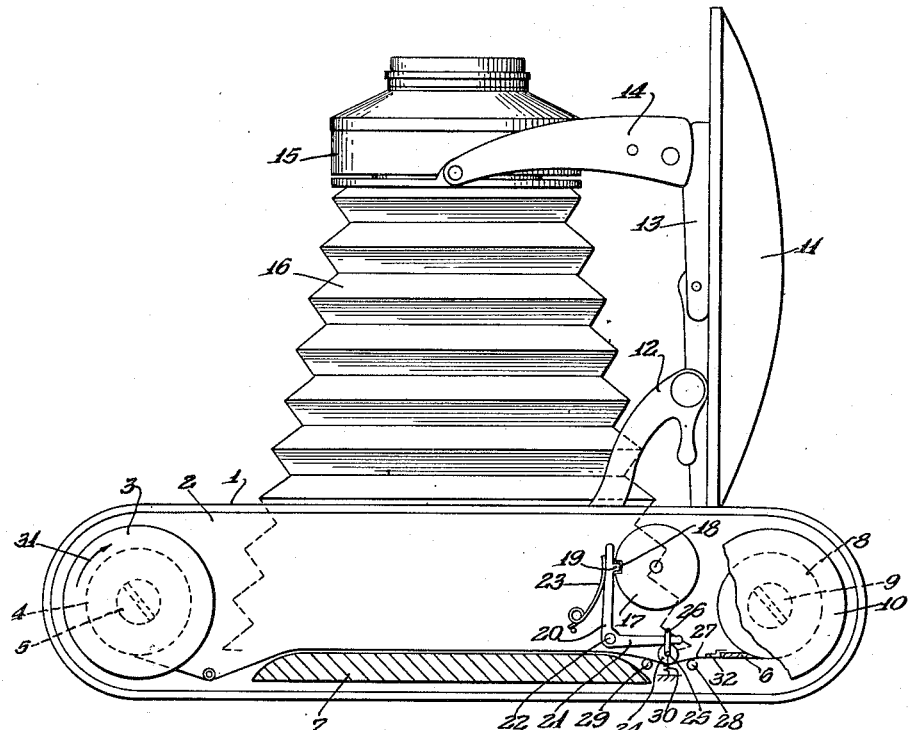

Oct. 19, 1954  R. F. SEWIG  2,691,925
CONTROL DEVICE FOR ROLL FILM CAMERAS
Filed March 20, 1951  5 Sheets-Sheet 1

INVENTOR
RUDOLF F. SEWIG
BY
ATTORNEYS

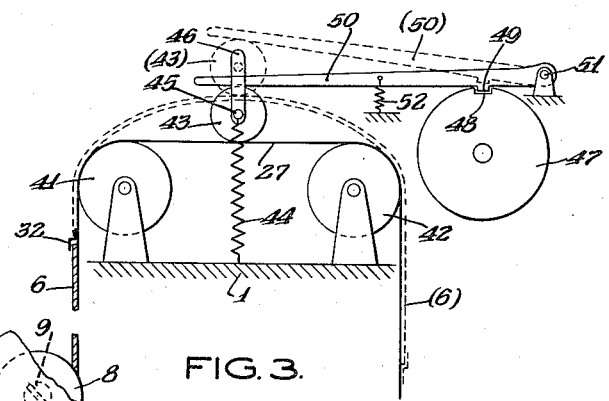
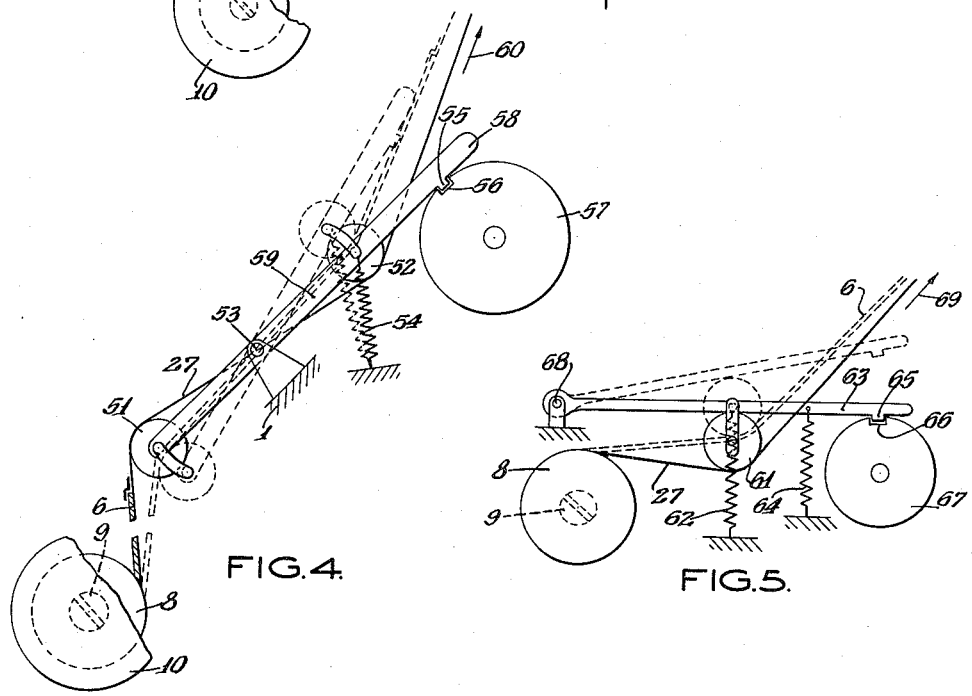
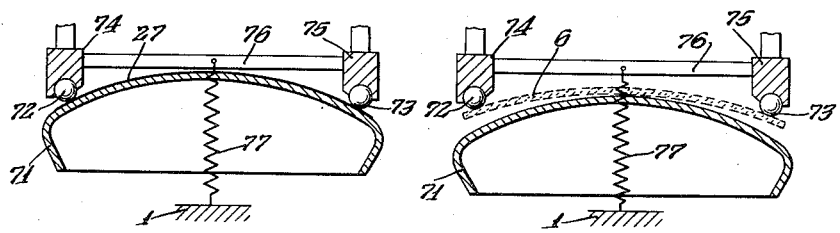

Oct. 19, 1954   R. F. SEWIG   2,691,925
CONTROL DEVICE FOR ROLL FILM CAMERAS
Filed March 20, 1951   5 Sheets-Sheet 3

INVENTOR
RUDOLF F. SEWIG

BY *Knock & Benn*
ATTORNEYS

Oct. 19, 1954 R. F. SEWIG 2,691,925
CONTROL DEVICE FOR ROLL FILM CAMERAS
Filed March 20, 1951 5 Sheets-Sheet 5

INVENTOR.
RUDOLF F. SEWIG
BY Mock + Blum
ATTORNEYS.

UNITED STATES PATENT OFFICE 2,691,925

CONTROL DEVICE FOR ROLL FILM CAMERAS

Rudolf F. Sewig, Braunschweig, Germany, assignor to Voigtländer & Sohn Aktiengesellschaft, Braunschweig, Germany, a corporation of Germany Application March 20, 1951, Serial No. 216,606

Claims priority, application Switzerland March 22, 1950

2 Claims. (Cl. 95—31)

This invention relates to a device for carrying out a control step in film stop and counting mechanisms of roll film cameras and it has particular relation to a new and improved device of this type, the operation of which is not dependent on the thickness of the film and the paper-leader of the film.

The main object of the present invention is to provide a device of the above-mentioned type, operation of which is based on the bending rigidity of the film or carrier of the sensitive layer and that of the paper strip connected therewith.

Another object of this invention is to avoid the disadvantages of known devices of the type here in question, the control organ of which is responsive to the thickness of the film and paper strip, respectively.

A further object of the invention consists in providing a device of the before-mentioned type which operates safely and independently from fluctuations in the thickness of the film and paper strip used in roll films.

Other objects and the advantages of the invention will be apparent from the appended drawings and the following specification and claims which illustrate by way of example some embodiments of the invention.

Devices for carrying out a control step in film stop and counting mechanisms of roll film cameras upon the insertion of a fresh film, have been known in the art. This control step is carried out when the paper-leader of the film is followed by the film proper.

The present invention relates to a new and improved device of this type. In connection with this invention, it is not essential whether the before-mentioned control step takes place when the film starts to reach the film window, or when the film has passed this window to such extent that a picture can be taken, or whether films having no paper-leader are used.

In the known devices of this type, the joint of the end of the film with the paper-leader is engaged by a contact element of the control device and this engagement is coupled with the actuation of a control organ in such a manner that the entrance of the first section of the film into the window is indicated, for example by locking again the drive of the take-up spool. This locking is then eliminated by releasing the counting mechanism. This counting mechanism was disconnected from the film control device upon the insertion of the fresh supply spool.

In known devices of this type, operation of the control organ is based on the varying thickness of the material moved within the camera. In other words, a feeler of the control device acts as a releasing means for the above-mentioned control-step in the stop mechanism by being mechanically displaced owing to the change in thickness at the joint of paper and film. This operation of the control device based on the thickness of the film-paper material has disadvantages. Various types of paper used as paper-leader, as well as various sensitive films show considerable differences in thickness. These tolerances may sum up so that the resulting difference in thickness may be very small in individual cases. Even in a normal case, deflection of the feeler is caused by a difference in thickness of as little as 0.3–0.4 mm. This control movement which is supposed to release the desired control step over a lever transmission, may become too small owing to the above-mentioned tolerances, because the deflection of the feeler proper becomes too small. In such a case the transmitted deflection of the lever may become insufficient for bringing about the necessary control step in the stop and counting mechanism. Under certain conditions, the too small deflection of the feeler is not effectively transmitted to the lever mechanism to be actuated. This results in disturbances which in most cases cannot be eliminated by the amateur.

The above outlined disadvantages are eliminated by the present invention. According to the latter, the control step of the feeler is not brought about by the effect of the varying thickness of the film and paper-leader, but by a device responding to the bending rigidity of the film and paper material. The effect of rigidity can be utilized with particular advantage if the material to be handled is bent or arched. The force, under which the material tends to return from the bent to the stretched position, is utilized according to my invention for displacing or otherwise affecting the position of a suitable member. This movement is then transmitted to the before-mentioned stop and counting mechanism by suitable means, for example over a gear, or leverage or other means conventional in the construction of photographic cameras.

I have found that utilization of the tension of the material according to the present invention has surprisingly favorable results in the construction of a mechanical gear. According to careful tests, the stroke acting directly owing to the straightening tensional force of the film, may be easily brought to about 5–6 mm. even in the case of a considerable displacing force. The thickness of the film layer and the adhesive strip play a completely inferior role and their tolerances require no consideration in carrying out my invention.

In the present invention, the stroke is more than ten times larger than the stroke obtainable under the most favorable conditions by the hitherto used method based on thickness. It is clear that this considerably higher stroke contributes to the safety of the entire control procedure, which is necessary when a fresh film spool is inserted, in connection with the stop and counting mechanism. Therefore, the mechanical construction of the gear can be much simpler and much less sensitive according to my invention. Furthermore, tests have shown that differences in the thickness of films within the tolerances have no effect of practical importance in the magnitude of the stroke to be measured, which is automatically brought about by the elastic straightening force of the material. In other words, the stroke is always sufficiently large in order to warrant safe functioning of the transmission and control gear.

The appended drawings illustrate, by way of example, some embodiments of my invention.

Figure 2:
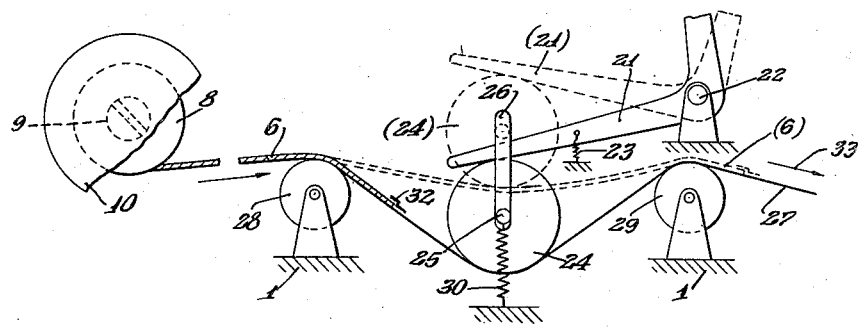
Figure 8:
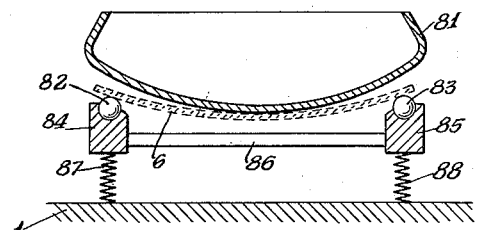
Figure 9:
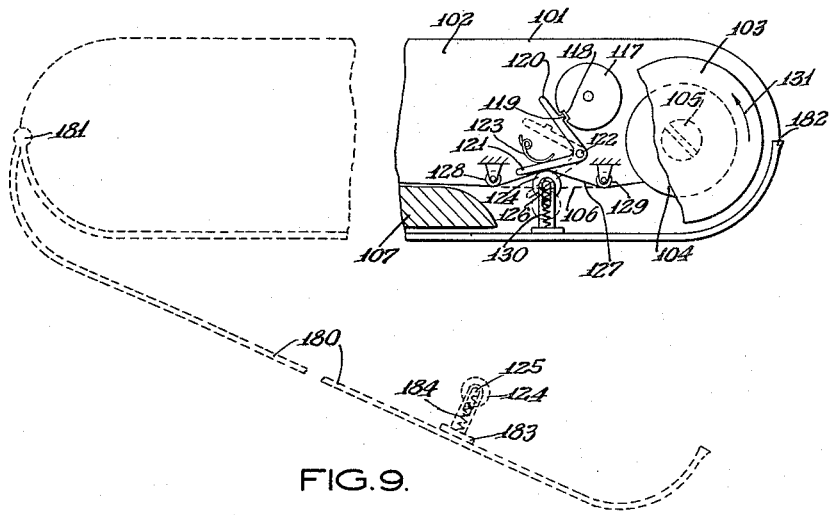
Figure 10:
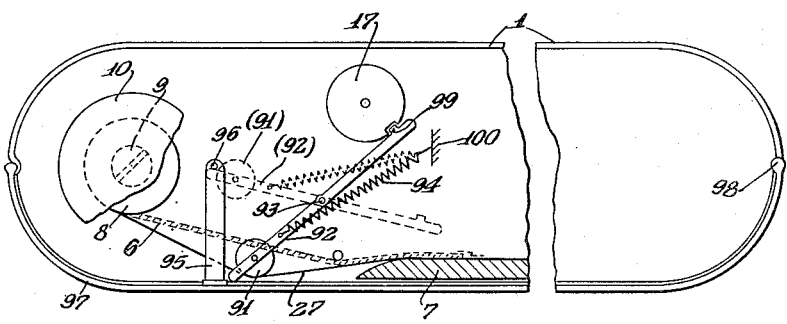
Figure 11:
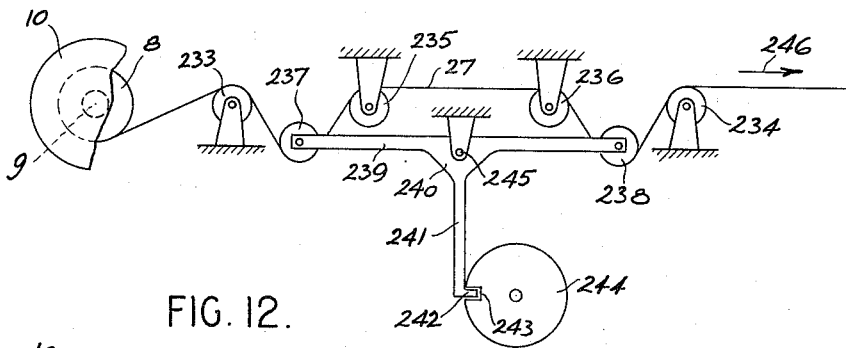
Figure 12:
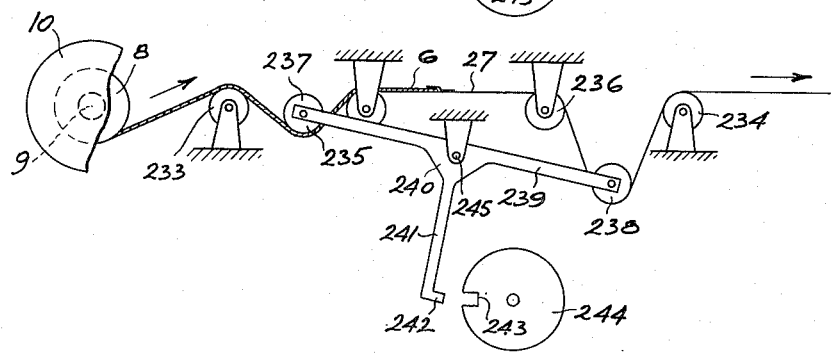
Figure 13:
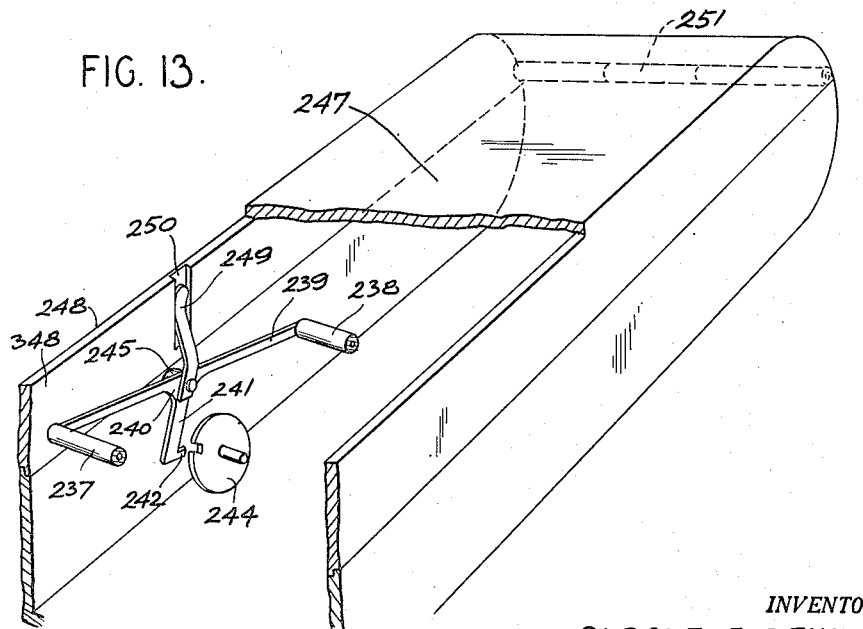
Figure 14:
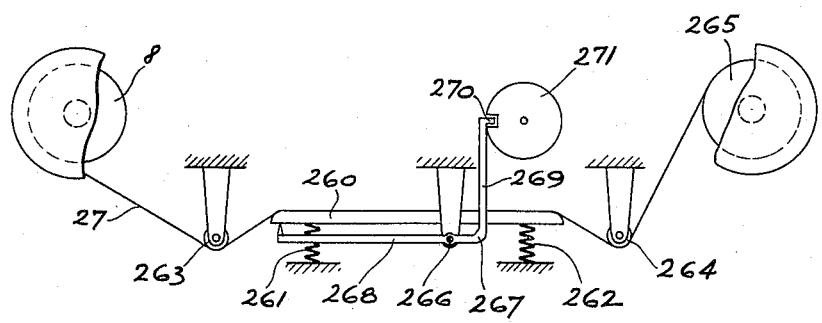
Figure 15:
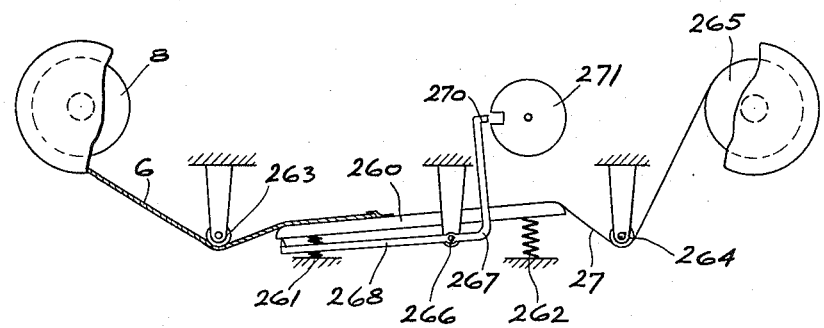

Figure 1 is a plan view of a roll film camera with the top plate removed; Figure 2 is a diagrammatical illustration of the invention, showing the essential elements on a larger scale; Figure 3 is likewise a diagrammatical illustration of another embodiment of the invention; Figures 4 and 5 illustrate further embodiments in which no separate guide rollers are necessary; Figures 6, 7 and 8 show somewhat modified constructions, in which the different rigidities of paper and film are utilized; Figures 9 and 10 illustrated two additional features of my invention; Figures 11–13 illustrate another embodiment of the invention, in which actuation of the device is based on differences of rigidity of film and paper and Figures 14–15 show a similar embodiment in which the pressure plate is utilized as a contact element.

Referring now to the drawings in detail, Figure 1 illustrates in plan view a roll film camera with the top plate removed so that the upper narrow surface of the camera body is exposed. For the sake of clearness, the gear appearing in this view has been omitted in Figure 1. From the stop and counting mechanism used in modern cameras only one ratchet has been shown. Additional elements of the gear have been omitted, because they are known in the art and do not form part of my invention.

Reference numeral 1 denotes the camera body, 2 the narrow top side of the camera, 3 the film-winding knob of spool 4, which is provided with shaft 5 and serves for taking up the exposed film. Knob 3 is turned after each exposure until an unexposed portion of film 6 is carried to the image space and positioned in front of pressure pad 7. Upon reaching this position, a locking mechanism, not shown, may prevent further turning of knob 3, or the moment when the next film number becomes visible, can be checked through a window in the rear wall of the camera. If a film is completely exposed, it must be replaced and a fresh film spool 8 is then inserted at the right in the camera, viewed in Figure 1. This spool 8 is provided at the upper end of its shaft 9 with a rotary knob 10 for winding back the completely exposed film, in the manner usual in certain camera types. 11 denotes the folding cover of the camera, which serves simultaneously as the base-board, and 12 is a conventional strut. 13 indicates a lever arrangment which is connected to and sets up link 14, to which objective-holder 15 is fastened. 16 is the conventional bellows of the camera. 17 denotes the ratchet wheel of the locking and counting mechanism. This wheel is provided with a notch 18 adapted to receive tooth 19 of the double-armed locking lever 20, 21 shown in this example. This lever is capable of swinging around stationary pivot 22 fastened to the casing of the camera. Spring 23 presses said lever permanently toward wheel 17. Swinging of the lever 20, 21 is brought about by roller 24, the axle 25 of which can be displaced in a slot 26. If the roller 24 moves upward from the position shown in Figure 1, it will cause lever arm 21 to move in the same direction, while the other lever arm 20 will swing against the pressure of spring 23 to the left in the drawing so that tooth 19 is removed from notch 18, and the mechanism is released. This release should take place only when the film enters the image space. But the moment of the release may be selected differently, for example the release may not occur until the film is positioned completely in the image space. The device shown in Figure 1 illustrates the first mentioned case. Furthermore, it is also possible to arrange the release of wheel 17 in such a manner that upon the release of wheel 17 a conventional camera transmission gear actuates a counting mechanism, the neutral position of which is switched on at the moment when film 6 is positioned completely in the image space. Therefore, it will be understood that my invention is not limited to the specific construction illustrated in Figure 1, and can be applied, without departing from its fundamental principles, in combination with locking and counting mechanisms of different construction.

The film is provided with a paper-leader 27, which is removed from the fresh film spool 8 and the end of which is fastened to the take up spool 4. In this step, the paper-leader has to be inserted in the control device according to the present invention. This control device comprises two guide rollers 28 and 29 and the before-mentioned roller 24 arranged between said guide rollers. This roller 24 is drawn by spring 30 to a position between rollers 28 and 29, and the paper leader takes up the curvature defined by rollers 28, 29, 30. Spring 30 is so dimensioned that axle 25 of roller 24 is held at the lower end, viewed in the drawing, of the guide slot 26. Insertion of the paper-leader in this simple control device causes no difficulty and does not affect the quick performance of the operation. After fastening the end of paper-leader 27 to spool 4, knob 3 is turned in the direction of arrow 31, whereby carrier 6 of the sensitive layer, the end of which is adhesively fastened to the paper-leader and, if desired, secured by an adhesive strip 32, is unwound from spool 8. It passes in front of the stationary guide roller 28 and follows paper-leader 27. Acting against spring 30, owing to its natural tension, film 6 presses roller 24 upward, viewed in the drawing. The position of roller 24 thus reached, will remain substantially unchanged, because there is no substantial change in the natural tension of the carrier of the sensitive layer. The above-mentioned displacement of roller 24 is accompanied by the likewise above-mentioned swinging of the double-armed lever 21, 20 and the release of tooth 19 from notch 18 of ratchet wheel 17. As mentioned above, double-armed lever 20, 21 is arranged on the narrow upper surface 2 of camera body 1. Therefore, roller 24 must either break through the entire width of this upper surface, or there must be a corresponding opening or recess for its movement along guide slot 26. However, this breach of the upper surface can be limited to the width of shaft 25 of roller 24, and a roller corresponding to roller 24 can be fastened above the broken surface on said shaft, lever 21 leaning against this roller under spring effect. In any case, care must be taken that no light should penetrate to film 6 through the perforation of the camera body. This can be done by means conventional in the construction of photographic cameras and, is therefore, not described here.

In order to more fully explain the details of my invention, Figure 2 illustrates the details of an embodiment similar to that shown in Figure 1, on an enlarged scale. Equal parts or parts having equal functions have been denoted in Figure 2 by the same reference numerals as in Figure 1. Reference numeral 8 denotes the spool carrying the fresh film, 9 is the shaft of this spool and 10 the knob for turning shaft 9. 27 is the paper-leader, 28, 29 are the rotatable but stationary guide rollers fastened to camera body 1, 24 is the contact roller, the shaft 25 of which is movable in guide slot 26. Spring 30 draws shaft 25 downward. Arm 21 of the double-armed locking lever capable of swinging around the stationary center point 22 is held down against contact roller 24 by spring 23. Roller 24 is in the position shown in full line in Figure 2 during passage of paper-leader 27, while the position of roller 24 shown in dotted line, illustrates the effect of the rigidity of film 6. As the rigidity of film 6 is much higher than that of the paper-leader 27, the downward pull of spring 30 is overcome and roller 24 is raised. Roller 24 is held in this position during the entire period of passage of the film. Thus, locking of the counting mechanism is limited to the period, during which the film is not inserted in the take up spool yet. Arrow 33 indicates the direction in which the film is advanced.

Figure 3 illustrates a further embodiment of my invention. In the latter, the difference between the rigidity of the film, and that of the paper, and the correspondingly different curvature of the film is utilized in actuating a control roller. In this figure, 8, 9 and 10 denote the film supply spool, 6 denotes the film, 27 the paper-leader and 32 an adhesive strip. 41 and 42 are stationary guide rollers fastened to the camera body 1. As shown in full line, the paper-leader 27 passes between rollers 41 and 42 along a substantially straight line. Contact roller 43 is held by the elastic force of spring 44 against paper 27 so that its shaft 45 is positioned at the lower part of guide slot 46. 47 denotes the ratchet wheel provided with notch 48 adapted to receive tooth 49 of stop lever 50, which is capable of swinging around stationary pivot 51. Spring 52 draws lever 50 permanently down to roller 43. As soon as the more rigid carrier of the sensitive layer 6 follows paper-leader 27 over roller 41, owing to its rigidity the film will be curved upward, as shown in dotted line in Figure 3. Overcoming the effect of spring 44 and spring 52, roller 43 is now pressed upward by the film, lever 50 is moved by roller 43 in the same direction and tooth 49 is lifted from notch 48 of ratchet 47. The counting mechanism is started by a transmission not shown and it is kept going until the film passes through the camera. Fluctuations in the elasticity of the film have no effect on the here described release of the counting mechanism.

The design of the control roller used in carrying out my invention, may be modified, in a manner similar to that of tension rollers used in transmissions. Such modification is illustrated in Figure 4 in which two control rollers 51 and 52 are shown, which are capable of swinging around a stationary center of rotation 53 connected with the camera casing 1. Separate guide rollers are not necessary in this arrangement. The passage of paper-leader 27 from supply spool 8, 9, 10, past rollers 51, 52 is shown in full line. As shown in dotted line, the more rigid film 6 causes against the effect of spring 54 swinging of rollers 51 and 52 and release of tooth 55 from notch 56 of ratchet 57. As diagrammatically shown in Figure 4, stop lever 58 may be an extension of connecting piece 59 between rollers 51, 52, or it may be connected therewith in any suitable manner. Arrow 60 indicates the direction in which the paper-leader is advanced.

In the embodiment illustrated in Figure 5, likewise no separate guide rollers are needed. Control roller 61 is held down by spring 62. Spring 64 draws stop lever 63 against roller 61 so that tooth 65 rests in notch 66 of ratchet 67. Stop lever 63 is capable of swinging around stationary center of rotation 68. As soon as film 6 unwound from supply spool 8, 9, comes in contact with roller 61, it lifts this roller and lever 63, as indicated in dotted line. By lifting tooth 65 of lever 63 from notch 66, it releases ratchet 67, so that the counting mechanism can be started.

The difference between the rigidity of the film and paper can also be utilized by the curvature of lateral portions. In this case, the more rigid carrier of the sensitive layer tends considerably stronger than paper, to adopt a straight position. Figures 6, 7, 8 illustrate diagrammatically this modification of my invention. In Figures 6 and 7, reference numeral 71 indicates a curved guide element which is preferably firmly connected to the camera body 1. Guide element 71 shown in Figures 6 and 7 is curved upward, while guide piece 81 of Figure 8 shows a curvature in the opposite direction. As shown in Figure 6, paper-leader 27 lies relatively close to surface 71 and is elastically held against this surface, for example by guide means elastically pressed toward the paper near the outer edges thereof. In the embodiment shown in Figures 6 and 7, these guide means consist of balls 72 and 73, carried by cages 74, 75. Several pairs of such balls may be arranged in succession. The cages are preferably connected by a rod 76. This rod and the guide means connected therewith are drawn downward by spring 77.

In contrast to the paper 27 shown in Figure 6, the more rigid film 6 tends to attain a straight position and, as shown in Figure 7, lifts the guide means 72, 73, 74, 75, 76, drawn downward by spring 77. Rod 76 is connected with the stop lever shown in the previous figures and lifting of rod 76 causes swinging of said stop lever and release of the counting mechanism.

Operation of the device shown in Figure 8 is fundamentally similar to that of the device shown in Figures 6 and 7. 82 and 83 are guide balls carried by cages 84 and 85, 86 is the connecting rod of the guide means, which acts on the stop lever. Instead of the draw-spring 77 shown in Figures 6 and 7, compression springs 87, 88 are arranged in the device of Figure 8 and these springs permanently tend to press guide means 82, 83, 84, 85, 86 toward guide surface 81.

The insertion of a fresh film and its paper-leader should take place as quickly and conveniently as possible and, therefore, it is preferred to avoid threading of the paper through the slit of the take up spool, if possible. This can be done in carrying out the present invention by fastening at least one of the rollers used in the control steps to a detachable element of the camera in such a manner that the paper-leader can be inserted in the device without threading. For example, the rear wall of the camera can be used for this purpose. In order to insert a fresh film, the rear wall of the camera must be opened anyhow. The roller carried by the rear wall cover will not come in engagement with the film to be curved before closing said cover.

This modification of the invention is illustrated by way of example in Figure 9, which shows a construction substantially similar to that of Figures 1 and 2. Reference numeral 101 denotes the camera body, and 102 the narrow upper surface, the cap of the camera being removed. The left part of the camera body is broken away and indicated by a dotted line only. 103 is the protruding film-winding knob of spool 104, 105, on which the exposed film 106 is wound in the direction of arrow 131. The film is advanced past pressure pad 107 and is guided by rollers 128, 129 on its way to spool 104. 180 denotes the rear wall of camera body 101 which is hinged in conventional manner at 181. Upon closing the camera, part 182 of rear wall cover 180 is interlocked with camera body 101. A socket 183 is arranged on the rear wall cover. This socket 183 carries part 184, by which contact roller 124 is held. Shaft 125 of roller 124 is movable in a slot 126 of body 184 and is pressed upward by compression spring 130. The pressure of this spring is selected in such a manner that, in the position shown in full line in Fig. 9, roller 124 presses upward paper-leader 127, while, owing to its inherent elasticity, the considerably more rigid carrier of the sensitive layer offers sufficient resistance to this bending effect to press roller 124 downward against the action of spring 130 and is, therefore, advanced in the substantially straight direction shown in dotted line in Fig. 9. In accordance with the position of film 106 and roller 124, shown in dotted line, contact lever 121, which is permanently pressed to roller 124 by spring 123, is likewise moved from the position shown in full line, which corresponds to the passage of the paper-leader, to the position shown in dotted line and, simultaneously, tooth 119 of the other arm 120 of contact lever 121, 120, is released from notch 118 of ratchet wheel 117 of the counting mechanism.

It will be understood from the above that the fresh film and its paper-leader can be inserted in the camera and fastened to take-up spool 104 without troublesome threading. During these steps the rear wall cover of the camera is open anyhow. After inserting the fresh film, the rear wall cover is closed as usual and the paper-leader 127 is then pressed upward to the position shown in full line. If now the film is wound up by knob 103, the counting mechanism will not start or cannot be set by hand before ratchet wheel 117 is released by lifting tooth 119 from notch 118. This, however, will not occur before the more rigid film presses downward roller 124, which was lifted during the passage of the easier flexible paper, and thus causes swinging of stop lever 120 in the above-described manner.

The control device according to my invention may be constructed also in such a manner that the control roller is lifted out of engagement with the film after transport of the film through the camera has started and remains out of engagement with the film during the transport thereof. Subsequently, the control roller is brought back to its initial position when a fresh film is inserted. This can be done for example during the opening of the rear wall of the camera by means of a carrying element connected with said rear wall.

Figure 10 illustrates this embodiment by way of example. The two-armed lever 92, which is pivotally mounted on a pivot 93 connected with the casing of the camera, carries control roller 91 at one of its ends, while its other end carries a tooth 99 adapted to engage ratchet wheel 17. A spring 94, one end of which is connected to the camera casing at 100, draws control roller 91 to the position shown in full line in Figure 10. Spring 94 is arranged in a direction forming only a small angle with lever arm 92. If now control roller 91 is caused to move upward by the sensitive layer carrier 6, owing to the higher bending rigidity of the latter, spring 94 will move beyond the stationary pivot 93. As shown in Figure 10, in this position, i. e. beyond point 93, spring 94 draws lever 92 upward until the end of this lever, or a pin or the like fastened thereto, abuts at stop 96. In this position of the double-armed lever, which is shown in dotted line in Figure 10, control lever 91 connected with lever arm 92 is lifted out of engagement with the sensitive layer carrier 6, and tooth 99 is out of engagement with ratchet 17, so that the counting mechanism is not locked. In the example shown in Figure 10, stop 96 is fastened to a carrier element 95 connected with rear wall 97 of the camera. Control roller 91 and lever 92 remain in the position shown in dotted line until rear wall 97 of the camera, which is hinged at 98, is opened after passage of the film through the camera. Upon opening the camera, stop 96 is moved together with wall 97, and it draws lever arm 92 with it, against the action of spring 94, to such an extent that spring 94 will be located again below pivot 93 and draw control roller 91 to the lower initial position shown in full line in Figure 10. Owing to the difference of the radii of swinging of the rear wall 97 of the camera and parts 95, 96 (around point 98) on the one hand, and that of lever 92 (around point 93) on the other hand, the left end of lever 92, viewed in Figure 10, will be released from stop 96, so that the rear wall of the camera can be completely opened.

Owing to the journaling of control roller 91 in lever arm 92 proper, the construction described requires the use of one spring only. This arrangement can be applied also to the embodiments illustrated in the other figures.

In all of the above described embodiments, the different bending rigidities of paper-leader and film, respectively, act against a constant pressure, preferably spring pressure, i. e. the spring is selected in such manner that displacement of a control member, caused by the film, automatically brings about the desired control step. It may, of course, happen that rigidity of the films used for taking pictures is not within the conventional limits. Thus, particularly elastic films may not exert sufficient pressure in order to overcome the opposite force of the spring and to bring about the displacement necessary for actuation of the control member.

This disadvantage is overcome by the embodiments described hereinafter, which require only a difference between the rigidity of film and paper material, and in which the absolute values of rigidity of film and paper are immaterial. In order to attain reliable and safe utilization of such difference, which may be very small, the arrangement must be independent from an extraneous force, e. g. spring force. In the embodiments illustrated in Figures 1–10, the arrangement comprises a spring and such devices are reliable and satisfactory in operation if films of conventional bending rigidity are used. The devices illustrated in Figures 11–15 are particularly suitable for use in connection with films of unusually low bending rigidity and in these devices the use of the beforementioned spring is eliminated. In these devices film and paper-leader pass through at least two feeler or contact means which are connected in such manner that the difference of displacements caused by the rigidity of the contact points is transformed into actuation of the control element.

Control devices of this type can be always used, for example in the case of thin or thick films, films consisting of various materials containing varying amounts of water and being fresh or old, and the device will be always responsive and reliable, if there is a clear difference between the rigidity of the film and that of the paper-leader.

In the embodiments illustrated in Figures 11–15, the arrangement is not dependent on the absolute value of bending rigidity of the materials used. The paper leader and the film pass successively through at least two feeler or contact devices which cause deflection of the materials in accordance with the natural rigidity of the latter without the use of an extraneous force, said devices being connected with each other in such manner that the difference or the ratio of displacements caused by rigidity of the contact feeler points is transformed into actuation of the control organ.

In these modifications of the invention, I prefer the use of two freely movable contact rollers, the axles of which are rigidly connected with each other by means of an intermediate member, which can be tilted in order to cause actuation of the control member. The paper or film advanced along the contact rollers is arched in the device. In order to obtain this effect, each of the contact rolls is arranged between two guide elements, preferably guide rollers, which are stationary with regard to the camera.

The contact members may be put under slight spring pressure, but this is not always necessary.

According to a specific embodiment, the film pressure plate is used as contact element. In this case the material to be contacted is deflected at the lateral edges of the pressure plate. Thus, said edges act as contact points. Owing to the different bending rigidity of the individual materials, the pressure plate of the camera is tilted and the control stroke originates from this movement of the pressure plate.

According to another modification, the contact means carry out a swinging movement during advance of the film, the first contact element, which has been caused by the more rigid film to move, returning to normal position when the film passes through the second point of contact and the latter is displaced by the bending rigidity of the film.

However, the device may be constructed also in such manner that only the first contact roller is displaced by the entering film, but the tilted connecting beam of the two contact rollers is then locked in the tilted position. This arrangement has the advantage that the locking lever which has been caused to swing together with said connecting beam and was thus lifted from the locking means of the counting disc, can be held easily in its lifted position, so that it cannot return to the locking position until the contact device returns to the initial starting position, i. e. until the film is run down. Displacement of the locking lever from its lifted position can be for example connected with the step of opening the camera rear wall. The arrangement for eliminating, during advance of the film, locking of the counting mechanism can be made in such manner that such elimination is automatically terminated before the use of a new film is started, e. g. by closing the camera cover.

It is of advantage to arrange, between the two contact rollers, on the connecing member a spring, latch or the like, which engages a groove or the like provided on the inner surface of the camera casing, upon tilting said connecting member and thus prevents the locking lever, which is rigidly connected with the connecting member, from returning into the ratchet wheel of the counting mechanism, when both contact rollers are affected in the same manner by the film. The locking lever proper can be designed as a latch or spring adapted to engage said groove provided in the camera casing.

It is of advantage to arrange said groove for retaining said spring or latch, on the inner surface of the narrow side of the camera casing in such manner, that the spring or latch is released by the groove upon opening the rear wall of the camera, i. e. upon removal of the exposed film.

The device illustrated in Figure 11 is a diagrammatical side view of an embodiment comprising two contact rolls in normal position, i. e. when either only paper or only film is advanced over both contact rollers. For the sake of clarity, all details of minor interest have been omitted.

Figure 12 shows the same device as Figure 11, in a position, in which the paper-leader is in contact with the contact roller arranged as the first roller in the supply direction, while the film has already reached the subsequent roller and owing to its higher bending rigidity, has caused swinging of the connecting member of the contact rollers.

Figure 13 diagrammatically illustrates a control device, in which the locking lever is held in its release position.

Figures 14 and 15 illustrate a control device, in which the film pressure plate serves for performing the function of contact organs. Figure 14 shows the normal position, while Figure 15 shows the tilted position, in which the film starts to advance along the plate.

The film contact device proper, illustrated in Figures 11 and 12, consists of an outer pair of guide rollers and an inner pair of guide rollers, the individual rollers 233, 234 and 235, 236, have stationary bearings, preferably each pair in a common plane, and of a pair of contact rollers 237 and 238. The axles of these rollers are journalled at the endpoint of cross bar 239 and thus rigidly connected with each other. In this embodiment, cross bar 239 is rigidly connected with a lever arm 241 and forms a T-shaped unitary structural member with said arm. Lever arm 241 is designed as a locking member and is provided with a projection 242 adapted to engage notch 243 of ratchet wheel 244. Connecting member 240 is pivoted at a stationary point 245 of the camera. This point is spaced from the planes of bearings of guide rollers 233, 235, 236, 234, in order to cause strong arching between rollers 233 and 235, as well as 236 and 234, of the paper and film material passing through the contact device. 8 is the film supply spool, which is connected by means of its shaft 9 with rewind knob 10 of the camera. Reference numeral 27 denotes the paper-leader and 6 the film.

The above described device operates as follows: Upon actuation of the winding knob, not shown in the drawing, paper-leader 27, which has been previously inserted in the device, passes first in the direction of arrow 246 over rollers 233, 237, 235, 236, 238 and 234. Owing to the natural tension, it tends to cause displacement of contact rollers 237 and 238, which cause the paper-leader to deviate from its straight course. However, as this effect or pressure is exerted by the paper simultaneously in the same direction and with the same intensity, on contact roller 237 as well as on contact roller 238, owing to its central pivot, cross bar 239 will exactly balance these two forces and thus neutralize them. Rollers 237 and 238 may be subjected, by means of springs not shown, to a certain, preferably slight pressure, which causes them to slightly press against the sheet material.

Thus the T-shaped connecting member 240 remains in its normal position, in which its lever arm 241 engages ratchet wheel 244, as shown in Figure 11. This locking position remains unchanged until identical material—i. e. in the drawing only the paper-leader—passes over the two contact rollers 237 and 238.

If winding of the film is continued, film 6 reaches the contact device, as shown in Figure 12. As a result of its higher natural tension, the pressure of film 6 on roller 237 prevails over the lower pressure of the paper-leader 27 on roller 238. Connecting member 240 is thereby tilted and causes disengagement of tooth 242 of lever 241, from ratchet wheel 244. Thus, the counting mechanism is put in operation.

Means are provided for preventing the return of connecting member 240 to its initial, i. e. locking, position, upon passing of film 6 beyond contact roller 238, and for arresting the control device 239, 240, 241, 242 in the position shown in Figure 12, during further advance of the film. Such means used in connection with the embodiment here shown, are illustrated, by way of example, in Figure 13, which is described hereinafter in detail and in which all elements, which are not absolutely necessary for explaining the device have been omitted.

Locking lever 241 can be fastened or linked to arm 239 also in such manner that, in the tilted position of arm 239, in Figure 12, lever 241 is removed from ratchet wheel 244, but return of tooth 242 to the position shown in Figure 11 is prevented if, owing to the construction of the device, arm 239 is caused to return to the normal position, upon passing of film 6 through contact point 238. In this case—which is not illustrated in the drawings—arm 239 and locking lever 241 have a connection which corresponds to the position shown in Figures 11 and 12 only up to the beforementioned removal of tooth 242 from ratchet 244. Subsequently, locking lever 241 is brought to an inclined position relative to the position of arm 239 shown in Figure 11, by means of a conventional latch or the like, and is held in said position until advance of the film is completed and return of locking lever 241, for example to the initial position which is perpendicular to arm 239, takes place, for example, upon closing the camera cover.

Figure 13 relates to a specific embodiment of the invention and is a view of the interior of the camera casing through rear wall 247, which is partly broken away, and shows the narrow side 248 of the camera casing. T-shaped connecting member 240 comprising cross bar 239 carrying contact rollers 237 and 238, and lever 241 provided with locking tooth 242, is rotatably arranged on stationary bolt 245 fastened to the camera casing. 244 is the ratchet wheel of the counting mechanism. Leaf spring 249 is fastened to connecting member 240 preferably as an extension, beyond bolt 245, of locking lever 241. The free end of said leaf spring bears under slight pressure, for example by means of a slight bend, against part 348 of narrow side 248 of the casing, forming part of camera cover 247. Said part 348 is provided with a groove-like recess 250, adapted to receive leaf spring 249 upon the occurence of displacement caused by the effect of the film. This situation is shown in Figure 13. Connecting member 240 is held in this release position until—after rewind of the film—camera cover 247 is opened, i. e. is swung about hinge 251. By this step, recess 250 is separated from leaf spring 249 and the latter and connecting member 240 return to the normal position.

The device described can be structurally simplified by using one roller only instead of the pair of rollers denoted 235, 236 in Figure 11, and arranging such single roller at an equal distance between contact rollers 237 and 238.

According to a further modification, the function of the contact organs and of the balance beam-shaped connecting piece, is assigned to the film pressure plate. In this modification, the sheet material to be contacted is bent at the lateral edges of the pressure plate and the plate is caused to swing in accordance with the varying bending stiffness of the advanced material. The plate is engaged by a locking lever which brings about switching on and off of the locking mechanism. A device according to this modification is diagrammatically illustrated in Figures 14 and 15.

Film pressure plate 260 is held by two springs 261 and 262. Two guide rollers, 263, 264 which are fastened to the camera casing and stationary relative to the same, are symmetrically arranged on the sides of the pressure plate in order to hold the paper and film advanced from supply spool 8 to take up spool 265, under moderate tension. An angle lever 267 having limited play is pivotally fastened at stationary point 266 of the camera casing. One arm of this lever is designed as a contact lever 268, which engages the pressure plate, in a manner not shown in detail, when the camera is closed. The other arm 269 serves as a locking lever by engaging ratchet wheel 271, by means of tooth 270.

If only paper material 27 is advanced, both lateral edges of pressure plate 260 as well as springs 261 and 262 will be under equal pressure and the pressure plate will be in its normal, horizontal position and have no contact or reaction with contact lever 268 (see Figure 14). In Figure 15, film and paper are advanced, and, in this case, one side of the pressure plate will be subjected to an excess load, owing to the greater bending rigidity of film 6. Pressure plate 260 is thus tilted and lever 267 caused to swing and brought out of engagement with ratchet wheel 271.

By conventional means well known in the art of camera construction, care is taken that the counting mechanism should remain in the unlocked position, after film 6 reaches guide roller 264 and return of the pressure plate to its normal position. Furthermore, means are provided for automatically locking the counting mechanism prior to the use of a fresh film.

It will be understood that my present invention is not limited to the specific steps, elements, arrangements and constructions described above and illustrated in the drawings and may be carried out with various modifications without departing from the scope of the invention as defined in the appended claims.

What is claimed is:

1. In a photographic roll film camera having means for stopping and counting the film paper as the frames arrive in position for exposure and locking means operatively connected to said means; the combination therewith of means for controlling said locking means and including a first and second guide roller engaging the film materials on the same side at two spaced points, said rollers having parallel stationary shafts; at least one control roller axially interposed between said first and second guide roller and engaging the film materials on the opposite side thereof; means mounting the control roller for bodily displacement laterally relative to the film material; spring means operatively connected to the control roller for urging the control roller into contact with the film material to deflect said material from a straight line between the guide rollers and means actuated by the bodily movement of the control roller away from the line of deflection, caused by the increase in bending rigidity of the film material as the film follows the paper leader strip over the control roller, for releasing the locking means.

2. A roll film camera as claimed in claim 1, in which the control roller is displaceably mounted in a guide slot and the spring means operatively connected to the control roller keeps the shaft of the control roller near an end of said guide slot while the control roller is in engagement with the paper leader of the roll film and said shaft is moved away from said end of the guide slot, against the effect of said spring means when the control roller is in engagement with the roll film advanced within the camera.

References Cited in the file of this patent

UNITED STATES PATENTS

| Number | Name | Date |
|---|---|---|
| 2,148,636 | Muller et al. | Feb. 28, 1939 |